Dec. 16, 1924.  1,519,541
C. E. JOHNSON
AIR CLEANING DEVICE FOR THE AIR INLET APERTURES OF
CARBURETORS OF AUTOMOTIVE VEHICLES
Filed Oct. 19, 1923
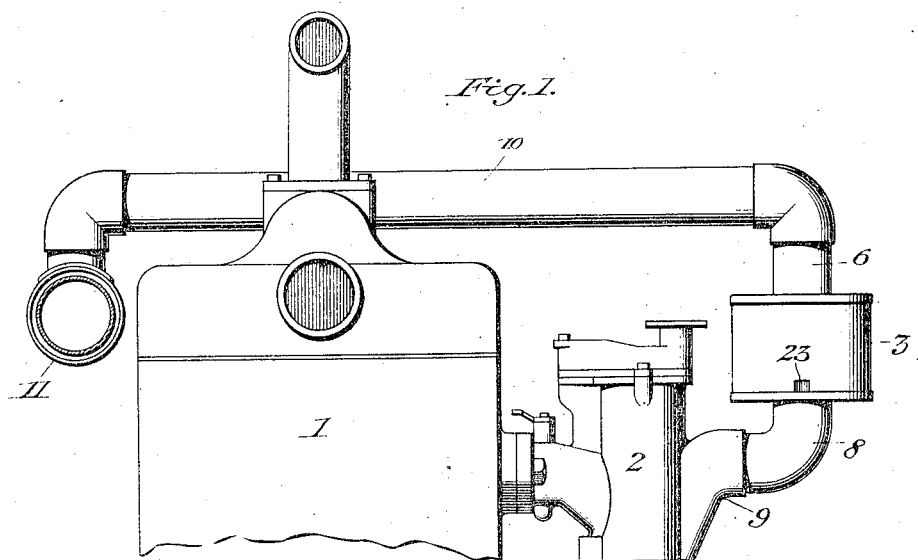
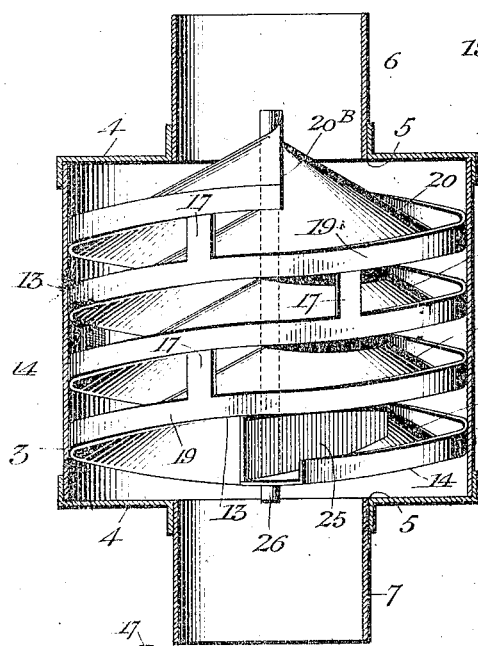
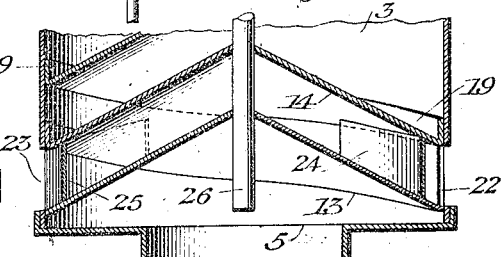
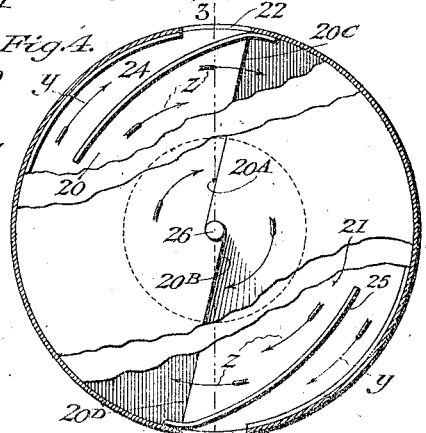
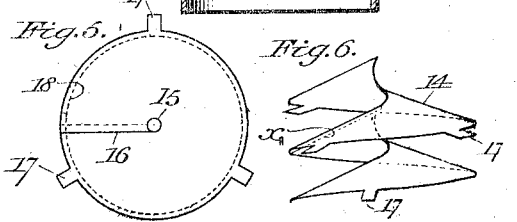
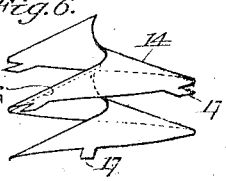
Inventor:
Charles E. Johnson
By H. S. Bailey. Attorney Patented Dec. 16, 1924.

1,519,541

UNITED STATES PATENT OFFICE.

CHARLES E. JOHNSON, OF DENVER, COLORADO.

AIR-CLEANING DEVICE FOR THE AIR-INLET APERTURES OF CARBURETORS OF AUTOMOTIVE VEHICLES.

Application filed October 19, 1923. Serial No. 669,632.

*To all whom it may concern:*

Be it known that I, CHARLES E. JOHNSON, a citizen of the United States of America, residing at the city and county of Denver and State of Colorado, have invented a new and useful Air-Cleaning Device for the Air-Inlet Apertures of Carburetors of Automotive Vehicles, of which the following is a specification.

My invention relates to an air cleaning device for the air inlet apertures of carburetors of automotive vehicles.

And the objects of my invention are:

First. To provide a multiple arrangement of spiral planes that receive atmospheric air through the medium of the suction strokes of the engine of an automotive machine acting through the carburetor, and automatically separates from the air, as it passes through it, the dust, grit, sand or bits of leaves and other matter that blows into the engine space under the hoods and against the engines and carburetors of automotive vehicles as they travel over roads, and that delivers clean air to the air inlet of their carburetors.

Second. To provide a stationary air cleaning device that can be attached directly to the air inlets of carburetors, that occupies very little space under the hood of the engine, and that is inexpensive to make and that is arranged to receive air flowing into the space under the hood around the engine through the radiator and openings in the hood, or to receive air heated by the exhaust manifold of the engine, and to deliver clean, hot or cool air to the carburetor.

Third. To provide a cooperating and coacting group of helical or spirally arranged air passageways that receive air simultaneously into several independent passageways at the furthermost end of the device from the carburetor, and conduct it concentrically around a common axis in spiral paths arranged at equidistances apart, and discharge it simultaneously into the air intake aperture of a carburetor to which my air purifying device is connected, the construction of the spiral passageways being so arranged that the particles of dust, dirt, sand, etc., that are heavier than clean air are separated from it and are discharged from the spiral passageways and the device, while the clean air flows into the carburetor.

I attain these objects by the mechanism illustrated in the accompanying drawings, in which:

Figure 1 is a front view of a portion of an automobile engine, having a carburetor attached thereto, and showing the improved air cleaning device connected with said carburetor and with an air inlet pipe.

Figure 2 is a vertical sectional view through the casing of the air cleaner, the cleaner proper being in side elevation.

Figure 3 is a vertical sectional view of a portion of the cleaner on the line 3—3 of Figure 4.

Figure 4 is a plan view partly broken away to show the outlets for the foreign substances which are separated from the air, and the deflectors adjoining the outlet openings which separate the cleansed air from that carrying the foreign substances. And Figures 5 and 6 are respectively a plan and a side view of a single helix, showing the radial spacing tongues as they appear before the circumferential edge portion of the helix has been upturned.

Referring to the accompanying drawings:

The numeral 1 refers to a portion of an automobile engine, and 2, to a carburetor which is operatively secured thereto, the improved air cleaner being adapted for use in connection with any of the various styles of carburetors in present use.

The improved device comprises the cleaner proper and a housing or casing surrounding the same, which is constructed and arranged as follows: The housing 3 is cylindrical in form and is closed at each end by a cap 4, each having an axial opening 5. A short air inlet tube or pipe 6 is secured in the opening of the upper cap, and an outlet pipe 7 is secured in the opening of the opposite cap, or the outlet pipe may be in the form of an elbow 8 as shown in Figure 1, the other end of which is connected to the air inlet 9 of the carburetor. The air inlet pipe 6 may terminate at any distance from the housing 3, or as shown, it may be connected by a pipe 10 with a sleeve 11 which surrounds, but is spaced from, the exhaust pipe 12 of the engine, whereby hot air is supplied to the carburetor.

The air cleaner proper may consist of a single helix, but I preferably employ two helixes 13 and 14, and turn or screw one within the other so as to form a double helix, and therefore a double air passageway, as will be understood by reference to Figures 2 and 4. Each helix is preferably formed from one or more thin sheet metal disks, according to the number of convolutions desired, and each disk is provided with an axial aperture 15, from which a radial slit 16 is cut and extends through the circumference of the disk. Then, by stretching the disk along the line of its axis until one edge of the slit is spaced a suitable distance from, and parallel with, the other edge, a helix is formed of one complete convolution, and by riveting or soldering two such helixes together, a helix of two complete convolutions is formed, as will be understood by Figure 6, such a helix providing a sufficient number of convolutions for the purpose required, though a helix having a greater number of convolutions may be employed if desired. In connecting two disks, the lower radial edge of one disk is caused to overlap the upper radial edge of the other disk, as shown by the dotted line at X in Figure 6, and the overlapping edges are secured together as above mentioned. Each disk is formed with integral radial tongues 17 which project from its circumferential edge as shown in Figure 5, and this edge portion is upturned on the dotted line 18 to provide a narrow circumferential wall or flange 19, which taken with the body of the disk, forms a circular gutter, around which the foreign substances such as heavy dust and grit are carried by the whirling current of air, as will presently be more fully explained.

After forming two helixes in the manner above described, they are assembled to form a double helix, by turning or twisting them to lie one within the other, as shown in Figure 2, the convolutions of the two helixes being properly spaced with respect to each other, and maintained in parallel relation throughout, by the tongues 17 of each helix which supports the convolutions or windings of the other helix, as clearly shown in the drawings. In assembling the two helixes, it is preferable to arrange them with their terminals extending in diametrically opposite directions, and thus arranged, they are placed in the housing 3, which fits tightly around them, and they may be held against turning, soldering them to the casing at one or more points.

It will thus be seen that the double helix, taken in connection with the wall of the housing 3, forms two independent winding air passages 20 and 21, which take the air at 20ᴬ and 20ᴮ respectively and discharge it at 20ᶜ and 20ᴰ respectively.

An outlet opening 22 is formed in the lower end portion of the wall of the housing at the point where the helix 13 terminates, and an outlet opening 23 is formed at a diametrically opposite point in the housing, where the helix 14 terminates. A vertically disposed metal deflecting or dividing strip 24 of suitable length is secured in the outlet portion of the air passage 20, the outer end of the strip being secured to the wall of the housing at the point where the helix 13 terminates, and a similar strip 25 is placed in the outlet portion of the passage 21, its outer end being secured to the wall of the housing at the point where the helix 14 terminates. These strips fit tightly between the two convolutions and serve to divide the air as it discharges from each passage, so that part of the air will discharge through the outlet openings 22 and 23, and the remainder will discharge into the housing. A rod or stem 26 is passed through the axial opening extending through the double helix, thereby to close the said opening.

In practice the improved air cleaning device is arranged as shown in Figure 1, or so as to connect its outlet pipe 7 with the intake of the carburetor, and when the engine is started, air is drawn by suction through the pipe 10 into the housing 3 and enters the passages 20 and 21 at 20ᴬ and 20ᴮ, and is given a swirling motion by the said passages, whereby the heavy dust and grit and other foreign substances in the air are thrown outward by centrifugal force and settle in the gutter at the marginal edge of each helix, and are finally discharged through the outlet holes 22 and 23 in the housing.

The deflectors 24 and 25 separate the dust and grit-laden air, represented by the arrows Y, from the clean air, as the dirt-laden air hugs the wall of the housing in its passage through the cleaner, and, therefore, is prevented by the said deflectors from discharging into the housing, while the clean air, represented by the arrows Z, is discharged into the housing, and passes thence through the elbow 8 into the carburetor.

By the employment of the improved device, air relieved of practically all foreign matter is delivered to the carburetor, thereby materially preventing clogging in the carburetor and the entrance of grit in the cylinders, and thus contributing to the general efficiency of the engine.

Having described my invention, what I claim is new and desire to secure by Letters Patent, is:

A dust cleaner of the character described, comprising a double helix, each having a marginal upturned flange, and upright tongues on said flange which serve to space the convolutions of the two helixes, said helixes terminating at diametrically opposite points, a casing tightly surrounding said helixes and having outlet openings in line with the terminal ends of said helixes, said casing having an inlet opening to the atmosphere and an outlet adapted to be connected with the inlet of a carburetor, said helixes forming a double air passage through said casing, vertically disposed partitions in the discharge terminal portions of said passages which separate the outlets leading to the atmosphere from the interior of the casing and are adapted to divide the air as it leaves the passages, so that part of said air is discharged into said casing and then drawn into the carburetor, the foreign matter in the air, being thrown outward by centrifugal force, is carried around the marginal portions of the helixes and discharged through the outlet openings in said casing leading to the atmosphere.

In testimony whereof I affix my signature in presence of two witnesses.

CHARLES E. JOHNSON.

Witnesses:
G. SARGENT ELLIOTT,
ELIZABETH SMITH.